United States Patent [19]

Schow

[11] 4,132,014
[45] Jan. 2, 1979

[54] WELDING SIMULATOR SPOT DESIGNATOR SYSTEM

[76] Inventor: Harvey B. Schow, 2320½ Brant St., San Diego, Calif. 92101

[21] Appl. No.: 807,892

[22] Filed: Jun. 20, 1977

[51] Int. Cl.² .............................................. G09B 19/24
[52] U.S. Cl. ........................................................ 35/13
[58] Field of Search .................... 35/13, 8 R, 22 R; 273/1 E

[56] References Cited

U.S. PATENT DOCUMENTS

| | | | |
|---|---|---|---|
| 1,286,529 | 12/1918 | Cave | 35/8 R |
| 3,867,769 | 2/1975 | Schow et al. | 35/13 |
| 4,041,615 | 8/1977 | Whitehill | 35/13 |

FOREIGN PATENT DOCUMENTS 54391  3/1943  Netherlands .............................. 35/8 R

*Primary Examiner*—William H. Grieb
*Attorney, Agent, or Firm*—Brown & Martin

[57] ABSTRACT

A source of light is located within the movable target of the welding simulator. The electrode holder mounts a welding rod with a reflective surface. Light from the light source is reflected by the reflective surface onto a spot designator surface. The spot designator surface is white so that the light is re-reflected as a spot to provide a visual cue as to the proper spacial relationship between the welding rod and target.

5 Claims, 4 Drawing Figures

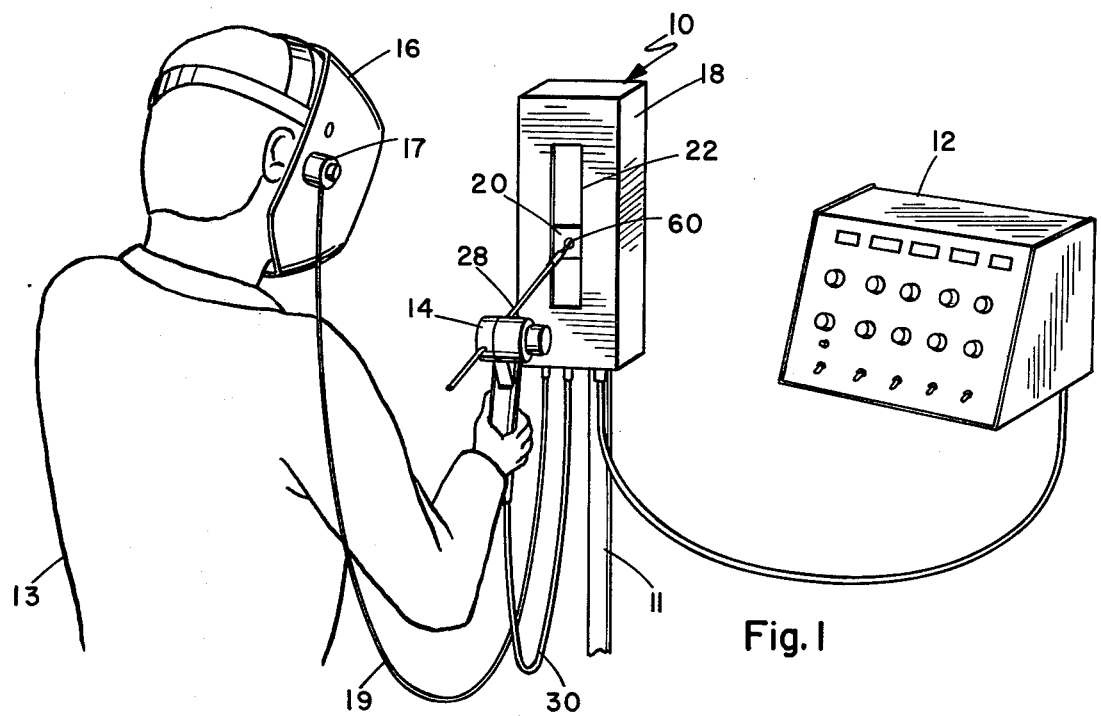
Fig. 1
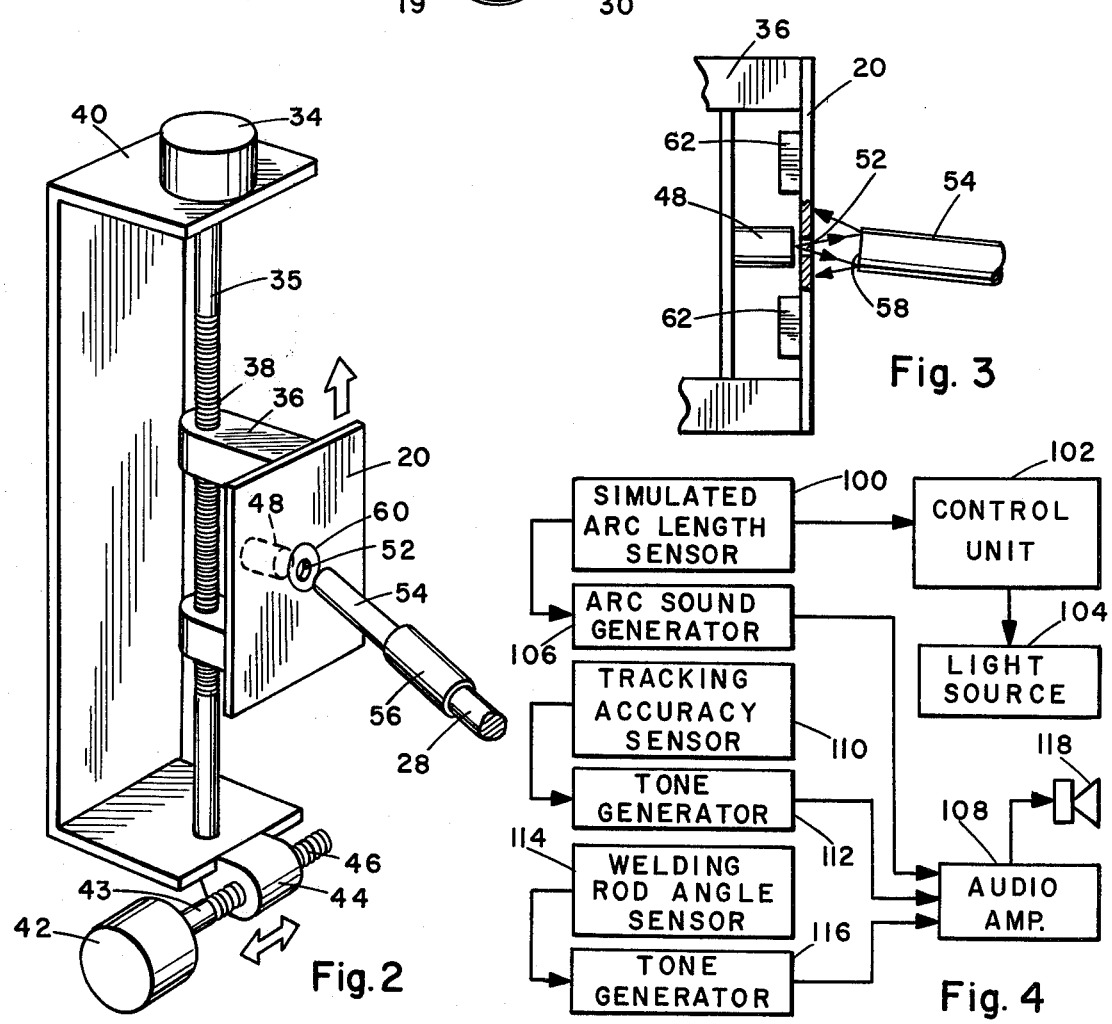
Fig. 2
Fig. 3
Fig. 4

WELDING SIMULATOR SPOT DESIGNATOR SYSTEM

In the past, welding trainees were taught the requisite psychomotor skills for welding by practical experience. Typically, this required that the trainee make numerous practice welds utilizing an actual welding machine and workstock until he developed the skills necessary to produce a quality weld. This training method led to the excessive use of materials and electrical energy, and provides no immediate qualitative feed back of performance to the trainee.

Applicant herein is a co-inventor of an "Arc Welding Simulator Trainer", U.S. Pat. No. 3,867,760, issued Feb. 25, 1975 and hereby incorporated herein by reference. Such a simulator trainer made it possible to develop the necessary skills for welding without exclusive reliance on making actual welds. The apparatus incorporates a movable target, an electrode holder with associated consumable electrodes (welding rod) and sensors for detecting the proper angular and distance relationship between the tip of the welding rod and the target. The trainees performance in making a simulated weld was scored so that after a simulated welding pass the trainee could obtain an indication of his performance. However, the capability of the system for immediate clues as to deviation from a proper welding procedure were limited. For example, so long as the distance between the welding rod tip and target was maintained within pre-set limits, the operator would receive no indication as to which end of the range he was approaching. Only after exceeding the range limits, would he receive an indication by an extinguishing of a light and by a warning tone.

In a further development of the welding simulator trainer, the mechanical connection between the welding rod tip and target has been eliminated. In apparatus according to the improved construction, non-contact sensors (Hall effect magnetic devices) are utilized to detect both distance of the welding rod tip from the target and the position of the welding rod tip over the moving target. The signals from the sensors are utilized to produce an aural and on-off visual indication to the operator when he deviates beyond settable limits in position or distance.

In neither of the aforementioned devices is there any means provided for a visual clue to the operator that corresponds to the experience of monitoring arc illumination in actual welding. Therefore, it is desirable to have a welding simulator trainer with a system for providing a visual clue as to the spacial relationship between the welding rod tip and the movable target. Such a system is particularly desirable where it provides an immediate and proportional indication of the spacial relationship.

SUMMARY OF THE INVENTION

For simplicity in description, the various parts of a welding simulator trainer are referred to according to the corresponding part in an actual welding apparatus. For example, the simulated consumable electrode is referred to simply as the welding rod.

In an exemplary embodiment of the invention, a spot designator system is provided so that the operator obtains visual clues as to the absolute and incremental changes in distance (arc length), alighment (position over target) and angle, so that all of the parameters of the relationship between the welding rod and target are displayed with an immediate and proportional indication of performance. A light source is mounted on the target for movement with the target. Illumination from the light source emanates from a hole in the target. The field of view of the light-hole is sufficiently great so that the entire range of proper, and marginally improper, positions of the welding rod tip is illuminated by light from the light source.

The welding rod incorporates a reflective surface. In the exemplary embodiment, the reflective surface comprises a polished metal surface at the welding rod tip. Where magnetic sensing is employed the polished surface may be a polished end of the magnetic material. When the welding rod is positioned within the field of view of the light source, illumination is reflected back toward the target from the welding rod tip.

A spot designator means is comprised of a reflective surface surrounding the target. Thus, light reflected from the welding rod tip is re-reflected by the spot designator means and is visible to the trainee.

The size of the spot that appears on the spot designator surface is effected by the distance above the target of the welding rod tip. The trainee is led to associate a particular spot size with a position of the welding rod tip that is between the limits of allowable tip distances.

The shape of the designator spot is primarily effected by the angular relationship between the welding rod and the target. For example, as the angle of the welding rod relative to the target surface is reduced, the designator spot becomes progressively more distorted with distance beyond the target, whereas with increasing angulation (approaching the perpendicular) the designator spot becomes progressively more regular (circular). Thus, the trainee learns to associate a given shape with an angle of the welding rod within the set limits.

The position of the designator spot is primarily determined by proper alignment (tracking) of the welding rod tip over the taget. The trainee monitors both the position of the target (light source) and the designator spot so that the trainee begins to anticipate the movements of the target to increase his percentage score in maintaining the tip-target alignment.

It is therefore an object of the invention to provide a new and improved spot designator system for welding simulators. The objects of the invention are accomplished by a highly simple and inexpensive system that requires little maintenance. The system provides an immediate visual clue in response to any movement of the welding rod tip by the trainee. All of the parameters of the spacial relationship necessary to produce high quality welds have a distinctive effect on the display. The display closely corresponds to that in actual welding experience.

Other objects and many attendant advantages of the invention will become more apparent upon a reading of the following detailed description together with the drawings in which like reference numerals refer to like parts throughout and in which:

BRIEF DESCRIPTION OF THE DRAWINGS

FIG. 1 illustrates the spot designator system in use.

FIG. 2 is a perspective view of the target and its actuating means, illustrating the relationship of the welding rod and target.

FIG. 3 is an enlarged side elevation view of the target, showing the light reflected from the welding rod tip onto the target.

FIG. 4 is a block diagram of the welding rod sensing and indicating system.

DETAILED DESCRIPTION OF THE DRAWINGS

Referring now to the drawings, FIG. 1 illustrates the relationship of the system to a welding simulator. The target mechanism 10 is shown supported in a vertical orientation on pole 11 and connected to a control and indicating system 12.

The target drive mechanism incorporates a housing 18 with a longitudinal opening 22 for the target designator surface 20.

A trainee 13 holds the electrode holder 14 in relationship to the target mechanism 10. The electrode holder 14 is connected to the target mechanism by cable 30. The operator wears a helmet 16 with loud speaker 17 connected to the target drive mechanism 10 by cable 19.

Referring to FIG. 4, a system block diagram for a welding simulator is illustrated. The system block diagram is conventional, however its description is of value in understanding the present invention. Simulated arc length sensor 100 produces a signal representative of the distance of the welding rod 28 above the target. In a magnetic sensor embodiment, the sensor 100 may comprise for example, magnetic Hall effect sensors 62 which are capable of providing a combined distance and positional reference. With the trainee maintaining a distance relationship within limits, the arc sound generator 106 produces a simulated arc sound which is presented to the trainee through the audio amplifier 108 and speaker 118 (corresponds to the speaker 17 in FIG. 1) so long as the arc is maintained within limits.

Similarly the tracking accuracy sensor 100 detects the positional relationship of the welding rod to the target and produces a first frequency tone (by tone generator 112) when predetermined limits are exceeded.

Welding rod angle sensor 114 determines when the welding angle exceeds preset tolerance limits and tone generator 116 produces a tone of a second tone frequency which is delivered to the trainee when the limits are exceeded. In addition to controlling the audio signals to the trainee, the arc length sensor may be utilized to control the power through the control unit 102 to the light source 104 (corresponds to light source 48 in FIGS 2 and 3). It should be noted, however, that no means are provided in the prior art for other than a mere on/off control over the light source and further that no means are provided in the prior art for varying the shape or other characteristics of the light source to provide visual clues to the trainee as to the instantaneous status of his tracking effort. Accordingly, the spot designator system according to the invention may be utilized to supplement or replace conventional sensors and indicators in welding simulators.

FIG. 2 illustrates diagramatically the mechanism within housing 18. In the preferred embodiment, the target comprises the light emanating from target opening 52 within the spot designator surface 20. Other indicia may supplement or replace the light in its function as a target within the scope of the invention. The entire sub-assembly is mounted on a carriage 36 for movement in two orthogonal directions. Movement along the longitudinal axis of the mechanism is accomplished through the use of a motor 34, driving a shaft 35. Threads 38 engage the carriage 36 for movement longitudinally in housing 18. Transverse movement of the target is accomplished by means of the motor 42 driving the shaft 43. Screw threads on shaft 43 cooperate with nut 44 to move the bracket 40, together with the associated target structure, transversely of the housing 18.

Referring specifically to FIGS. 2 and 3, the spot designator system is shown to comprise a source of light 48 which passes through the opening 52 to illuminate a field of view incorporating the range of all proper and marginally improper positions for the electrode 28. The electrode 28 is shown to be terminated in a cylindrical magnet 54 secured to the primary electrode structure by collar 56. The magnet 54 is employed in conjunction with sensors such as Hall effect sensor 62. It is to be understood that the magnetic sensors 62 and magnet 54 form no part of the invention herein. However, the use of the invention is particularly advantageous in association with such non-contact magnetic sensors. As will be apparent, in order to terminate in a magnet 54, the use of a separate mirror to reflect light is effectively precluded. Accordingly, the terminal end 58 of the magnet/welding rod is polished to a high finish so it forms an effective reflecting surface for the illumination from the light source 48. Light reflected from the surface 58 falls on the spot designator surface 20. The surface 20 is coated with a white material, such as white paint, so that a high percentage of the light falling on the surface 20 is re-reflected to appear to the trainee as a spot 60.

Referring to FIG. 2, a welding rod position which positions the tip 58 essentially directly over the target opening 52 results in an oblong spot 60 in the position illustrated. Such an oblong spot, of correct configuration, indicates to the trainee that the tip of the welding rod is in proper position (over the target) at a proper angle (proper oblong shape) and at the correct distance (proper spot size). If the tip is permitted to vary from its relative position to the opening 52, spot 60 will move correspondingly, indicating that the welding rod tip has been moved out of position. When the rod is moved sufficient distance to be moved out of the field of view of the light source 48, no spot will appear, further reinforcing corrective action. Similarly, as to shape, a highly distorted shape indicates too little angle between the welding rod and target surface 20 whereas a nearly circular shape for the spot 60 indicates too high an angle (too nearly rectangular) relationship. Finally, the trainee can determine by experimentation the smallest and largest spot sizes which correspond to the limits of travel for the sensing mechanism. Thereby, by maintaining the spot size intermediate between the two limiting sizes the trainee is able to maintain a high percentage of duration for the rod being at a correct distance from the target.

Having described my invention, I now claim:

1. A spot designator system for a welding training simulator wherein the simulator incorporates a movable target, for providing a visual indication of the spacial relationship between the end of a welding rod and the movable target, said system comprising:
   a light source means within said movable target for illuminating a range of welding rod tip spacial orientations,
   reflective means on said welding rod for reflecting a portion of said illumination,
   spot designator means comprising a surface adjacent to and surrounding the center of said target for reflecting at least a portion of the illumination from said reflective means and providing visual clues in maintaining the proper spacial relationship between the welding rod and target.

2. A spot designator system according to claim 1, wherein:
said reflective means comprises a reflective surface.

3. A spot designator system according to claim 1, wherein:
said reflective means comprises a reflective surface of the welding rod.

4. A spot designator system according to claim 3, wherein:
said reflective surface comprises a polished metal end of said welding rod.

5. A spot designator system according to claim 1, wherein:
said spot designator means comprises a substantially flat surface with a light coloration.

* * * * *